(12) United States Patent
Eshet et al.

(10) Patent No.: US 8,355,450 B1
(45) Date of Patent: Jan. 15, 2013

(54) BUFFER DELAY REDUCTION

(75) Inventors: Amit Eshet, Kiryat Tivon (IL); Modi Finkelstein, Tel Aviv (IL); Nery Strasman, Ramat Gan (IL)

(73) Assignee: ARRIS Solutions, Inc., Suwanee, GA (US)

( * ) Notice: Subject to any disclaimer, the term of this patent is extended or adjusted under 35 U.S.C. 154(b) by 1104 days.

(21) Appl. No.: 12/248,892

(22) Filed: Oct. 9, 2008

Related U.S. Application Data

(60) Provisional application No. 60/978,414, filed on Oct. 9, 2007.

(51) Int. Cl.
*H04N 7/12* (2006.01)
(52) U.S. Cl. .......... 375/240.25; 375/240.08; 375/240.01
(58) Field of Classification Search .................... None
See application file for complete search history.

(56) References Cited

U.S. PATENT DOCUMENTS

| | | | |
|---|---|---|---|
| 6,654,421 B2 * | 11/2003 | Hanamura et al. ....... | 375/240.26 |
| 7,136,415 B2 * | 11/2006 | Yun et al. ................. | 375/240.26 |
| 7,239,702 B1 * | 7/2007 | Asano et al. ............... | 380/201 |
| 2005/0254798 A1 * | 11/2005 | Kato ......................... | 386/125 |
| 2009/0070843 A1 * | 3/2009 | Shibata et al. ............. | 725/117 |
| 2010/0014594 A1 * | 1/2010 | Beheydt et al. .......... | 375/240.26 |
| 2010/0129052 A1 * | 5/2010 | Fujinami et al. ............ | 386/69 |
| 2010/0158135 A1 * | 6/2010 | Yin et al. ................. | 375/240.26 |
| 2011/0091032 A1 * | 4/2011 | Sato et al. ................. | 380/28 |
| 2011/0093895 A1 * | 4/2011 | Lee et al. .................. | 725/40 |
| 2011/0167468 A1 * | 7/2011 | Lee et al. .................. | 725/132 |

* cited by examiner

*Primary Examiner* — David Y Jung
(74) *Attorney, Agent, or Firm* — Troy A. Van Aacken; Robert J. Starr

(57) ABSTRACT

A system, method and computer program product, the method includes: locating within a media stream video of interest that starts at a random access point and ends at a packet associated with timing information that corresponds to a decoding time stamp of the random access point; modifying the video of interest to provide modified video of interest; wherein the modifying comprises modifying timing information associated with a beginning of the random access point to reflect a difference between the decoding time stamp and a transmission duration of the modified video of interest to a user; receiving a request, from the user, to perform a channel change and start receiving a channel that comprises the modified video of interest; and transmitting to the user the modified video of interest.

23 Claims, 6 Drawing Sheets

BUFFER DELAY REDUCTION

RELATED APPLICATIONS

This application claims priority from U.S. provisional patent Ser. No. 60/978,414, filing date 9 Oct. 2007; and from U.S. provisional patent Ser. No. 60/987,117 filing date 12 Nov. 2007.

FIELD OF THE INVENTION

This application relates to method, system, device and computer program product for reducing buffer delay.

BACKGROUND OF THE INVENTION

Buffer Delay Reduction

Channel Change may take several seconds. One of the biggest factors is the time between the transmission of a video random access point and its decoding time, referred also as the buffer delay. Advanced encoders use such buffering to simplify their rate control and to allow maintaining quality when the content becomes harder to encode—they send the larger pictures over more time rather than using higher BR taking advantage of the time covered by the already buffered data. This problem is taken to the extreme with new coding specifications allowing encoders to generate decoding delay of up to 10 seconds.

FIG. 1 illustrates portion 10 of video. It includes video frames 10, 20, 30 and 40 that are delimited by boundaries 12, 22, 32 and 42, packets 10(1)-10(j) of frame 10, packets 20(1)-20(k) of frame 20, packets 30(1)-30(l) of frame 30, packet 40(1) of frame 40, and a decoding time stamp 50 that "falls" on packet 30(l).

Boundary 12 is the start of a random access point (also referred to as rap point). Packet 10(1) has is associated with the following timing information: program time stamp (PCR) =0, decoding time stamp (DTS)=1200 mS (mili-second) and presentation time stamp (PTS)=1290 mS. Packet 10(j) includes PCR=100 mS, packet 20(2) includes PCR=200 mS, packet 30(2) includes PCR=700 mS.

Packet 30(l) has a PCR of about 1200 mS and hence DTS of frame 10 "falls" on it. In this example the buffer delay equals 1200 mS-1200 mS will pass between the reception of packet 10(1) and its decoding. It is noted that the DTS of frame 10 can fall on other packets and not necessarily on the last packet of frame 30.

There is a growing need to reduce the delay introduced by the buffer delay.

Bit Rate Allocation

In IPTV environments, most of the broadcast streams are multicast in order to save bandwidth on the backbone. This way all users (viewers) that want to watch the same program join the same multicast stream.

A problem occurs when the operator wants to provide a Fast Channel Change (FCC) feature to the users. If the users simply join a multicast stream they would begin receiving the stream at random points and not at random access points (such as I pictures in MPEG-2 and other standards). In this case these users would not experience a fast tune-in into the program. In order to overcome this, the operator buffers a part of the stream and when the user wants to change the viewed channel, the system streams—in unicast—data beginning with the last I picture. The unicast stream is transmitted at a high bit-rate. This continues until the point where the data to be unicast catches up with the data which is multicast. At this point, the user is instructed to leave the unicast stream and join the multicast stream. Transmitting unicast streams is therefore mandatory to enable FCC. However, unicast streams require additional bandwidth on the backbone. When many streams are transmitted there may not be enough bandwidth to serve all the different viewers. It is noted that there may also be a bandwidth shortage on a network elements such as a DSL line that is connected to a user premises.

One way of overcoming the problem is by allocating fixed bandwidth to the different multicast and unicast streams. Assuming that the multicast bandwidth or their maximum bandwidth is known, the system allocates the remaining bandwidth to a fixed number of unicast streams N. This means that only N viewers can receive a FCC service at any given time. Also, allocating a fixed bandwidth per unicast stream determines the period it will take until the unicast stream catches up with the multicast stream.

SUMMARY

A method, the method includes: locating within a media stream video of interest, wherein the video of interest starts at a random access point and ends at a packet associated with timing information that corresponds to a decoding time stamp of the random access point; modifying the video of interest to provide modified video of interest; wherein the modifying includes modifying timing information associated with a beginning of the random access point to reflect a difference between the decoding time stamp and a transmission duration of the modified video of interest to a user; receiving a request, from the user, to perform a channel change and start receiving a channel that includes the modified video of interest; and transmitting to the user the modified video of interest.

A system including: a first interface for receiving a media stream; a video processor configured to: locate within a media stream video of interest, wherein the video of interest starts at a random access point and ends at a packet associated with timing information that corresponds to a decoding time stamp of the random access point; modify the video of interest to provide modified video of interest by modifying timing information associated with a beginning of the random access point to reflect a difference between the decoding time stamp and a transmission duration of the modified video of interest to a user; and a user interface configured to: receive a request, from the user, to perform a channel change and start receiving a channel that includes the modified video of interest; and transmit to the user the modified video of interest.

A computer program product that includes a computer readable medium that stores instructions for: locating within a media stream video of interest that starts at a random access point and ends at a packet associated with timing information that corresponds to a decoding time stamp of the random access point; modifying the video of interest to provide modified video of interest; wherein the modifying includes modifying timing information associated with a beginning of the random access point to reflect a difference between the decoding time stamp and a transmission duration of the modified video of interest to a user; receiving a request, from the user, to perform a channel change and start receiving a channel that includes the modified video of interest; and transmitting to the user the modified video of interest.

A method, the method includes: (a) storing, at a buffer of a user, amended video of interest that starts at a random access point and ends at a packet associated with timing information that corresponds to a decoding time stamp of the random access point; wherein the amended video of interest includes metadata that includes conditional access information and program specific information and is positioned in proximity to the random access point; (b) determining, by a controller, an actual duration of transmission of the amended video of interest; (c) modifying, by the controller, the amended video of interest to provide modified video of interest; wherein the modifying including modifying timing information associated with a beginning of the random access point to reflect a difference between the decoding time stamp and an actual transmission duration of the amended video of interest to a user; (d) sending to a decoder of the user the modified video of interest.

A computer program product that includes a computer readable medium that stores instructions for: storing, at a buffer of a user, amended video of interest that starts at a random access point and ends at a packet associated with timing information that corresponds to a decoding time stamp of the random access point; wherein the amended video of interest includes metadata that includes conditional access information and program specific information and is positioned in proximity to the random access point; determining, by a controller, an actual duration of transmission of the amended video of interest; modifying, by the controller, the amended video of interest to provide modified video of interest; wherein the modifying includes modifying timing information associated with a beginning of the random access point to reflect a difference between the decoding time stamp and an actual transmission duration of the amended video of interest to a user; sending to a decoder of the user the modified video of interest.

A device, including: a buffer of a user, configured to store amended video of interest that starts at a random access point and ends at a packet associated with timing information that corresponds to a decoding time stamp of the random access point; wherein the amended video of interest includes metadata that includes conditional access information and program specific information and is positioned in proximity to the random access point; a controller configured to: determine an actual duration of transmission of the amended video of interest; modify, by the controller, the amended video of interest to provide modified video of interest; wherein the modifying includes modifying timing information associated with a beginning of the random access point to reflect a difference between the decoding time stamp and an actual transmission duration of the amended video of interest to a user; and send to a decoder of the user the modified video of interest.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Figure 1:
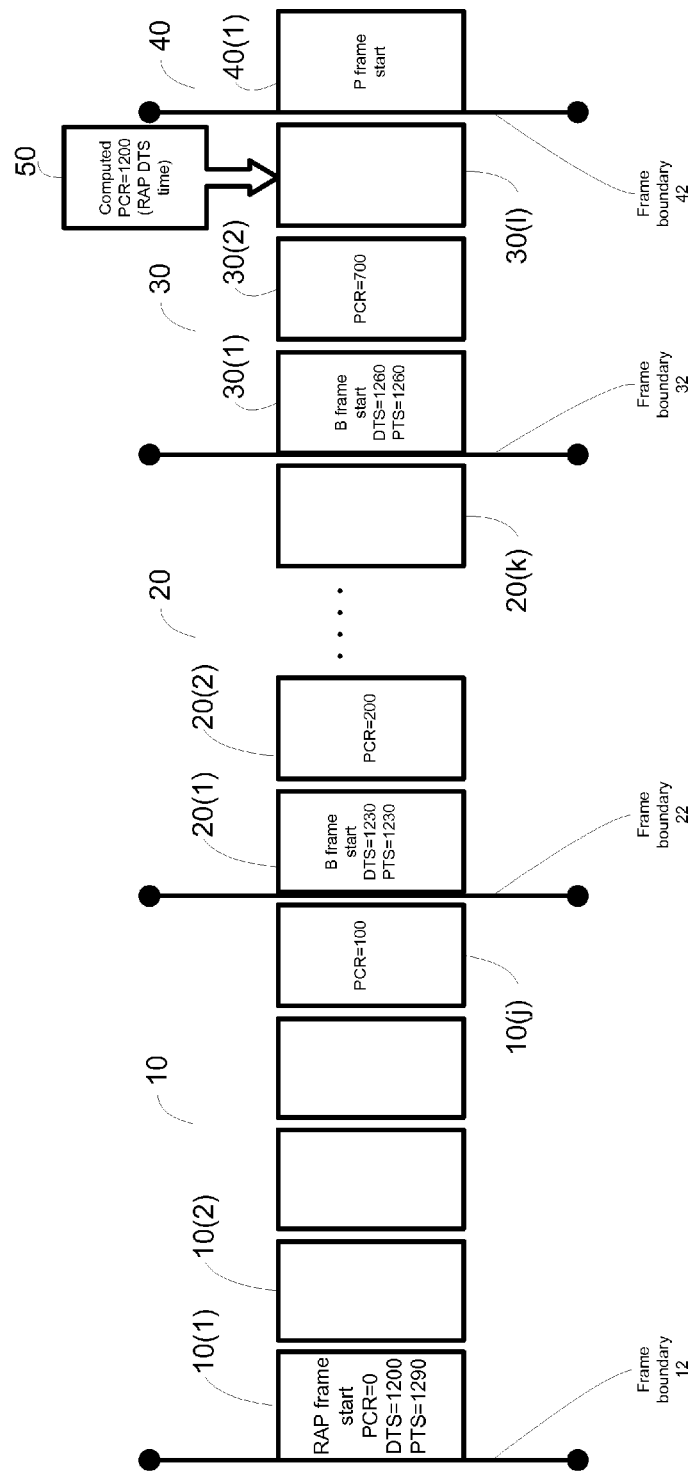
FIG. 1 schematically shows a prior art portion of a video stream.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

In the following specification, the invention will be described with reference to specific examples of embodiments of the invention. It will, however, be evident that various modifications and changes may be made therein without departing from the broader spirit and scope of the invention as set forth in the appended claims.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

For simplicity of explanation it is assumed that a media stream is MPEG-2 compliant and that the transport layer is an MPEG-2 transport layer. It is noted that the methods and systems described below are not limited to these standard and transport layer.

The term "video of interest" means video that starts at a random access point and ends before (or at) a decoding time stamp of that random access point. For example, the video of interest can start at a random access point and end at the decoding time stamp of that random access point. Yet for another example, it can include a video frame that starts at the random access point but ends before the decoding time stamp. It can also include one or more frames that follow that video frame. The video of interest belongs to a so-called channel of interest. Video of interest can be amended by altering its timing information and, additionally or alternatively, by adding metadata before its starting point to provide modified video of interest.

A video provider such as a video server, video processor, processed video and sends it to a user (also referred to as a client or a receiver) such as a set top box.

The term "new user" means a user that requested to tune to the channel of interest during a transmission of a current group of pictures that includes the video of interest.

The term "Existing user" means a user that tuned to the channel of interest during a transmission of a previous GOP—so that the decoder was tuned to this channel before the start of the current GOP.

The term "Leaving user" means a user that is getting the original stream packets and waits for packets marked as "leaving users" packet. In some cases there is a need to send a special "EOS" (End of Sequence) transport packet to mark for the decoder that the content video parameters is going to change. The video processor 302 will also make sure that the "leaving users" will get a complete frame before leaving the stream.

Conveniently, a buffer delay can be reduced (and even almost eliminated) by changing timing information associated with video of interest. The timing information associated with the video of interest can be changed to indicate that it is transmitted near to the decoding time stamp. In addition the modified media information of interest is transmitted by utilizing a high bit rate—in a so called burst mode.

The timing information can be amended in response to the expected duration of the transmission of the video of interest. Additionally or alternatively, it can be amended in response to the actual duration of such a transmission. For example, the program time stamp (PCR) that will be associated with the beginning of the amended video of interest can be updated to substantially equal the difference between the decoding time stamp (DTS) and the expected duration of transmission (Tde): PCR=DTS−Tde. Yet for another example, PCR can be updated to substantially equal the difference between the decoding time stamp (DTS) and the actual duration of transmission (Tda): PCR=DTS−Tda.

The timing information can be amended by a device that transmits the modified video of interest, and additionally or alternatively, by a device that receives the video of interest. For example a video processor can change the timing information in view of the expected duration of the transmission. Yet for another example, a set top box or another receiver can amend the timing information according to the actual duration of the transmission.

Conveniently, the modified video of interest is transmitted at a high (conveniently—the highest available bit rate), as close to the decoding time stamp as possible.

The bit rate can be limited by various parameters such as but not limited to transmission constraints, available bandwidth limitations, buffer limitations, maximal input bit rate of a data buffer, and the like.

Additionally or alternatively, metadata such as program specific information (PSI) tables, a first PCR (with a re-stamped value), conditional access information (such as ECM) can be placed before the beginning of the random access point in order to enable fast channel change. Fast channel change will start by retrieving this metadata and then retrieving the video of interest. This metadata can be located in a dedicated packet or data structure. This metadata can be flagged or otherwise marked so that a transmitting device will not transmit it to existing users, while transmitting this to new users.

PCRs of the video of interest that follow the first PCR will be replaced by stuffing, whereas the last PCR within the modified video of interest can be re-stamped to the value of the decoding time stamp.

Conveniently, non-video packets that should be processed by a receiver prior to the video decoding time stamp can be removed. For example—audio information relating to new channel (the channel that should be received after the fast channel change request) but associated with a timing that precedes the video decoding time stamp should be removed.

Yet according to another embodiment of the invention if the group of pictures (GOP) that starts at the random access point is an open GOP—includes frames that depend upon frames of a previous group of pictures than it is closed—the dependency to the previous GOP will be removed. This so-called "closed" GOP is sent to new users—conveniently in a unicast stream.

Transmitting the modified video of interest at the highest available bit rate can reduce network congestion. The maximal available bit rate can be provided to the video provider by a network element such as a network controller or a network monitor. Additionally or alternatively, the video provider can monitor the network and learn the bit rate limitations of the network.

According to the invention the bit-rate used for a unicast stream such as unicast stream that includes the modified video of interest is not fixed. It is dependent on: the (overall) available bandwidth, the number of other unicast and multi-cast streams at the time of transmission and a maximum bit-rate allowed by the user. The bandwidth allocated to each unicast stream is variable. As a result, all FCC requests can be served. Whenever, the full bandwidth is not in use, unicast streams can increase their bit-rate thus shortening the time until the unicast stream catches up with the multicast stream.

Conveniently, the transmitting can include transmitting to the user the modified video of interest in a variable BR way based on the available BW in order to minimize the transmission time.

System 300 can perform such bit rate allocation but this is not necessarily so. For example, if other entities are transmitting unicasts and/or multicasts over network 380 then network controller 382, which is aware of these various bit rate limitations can determine the bit rate to be allocated to each unicast and multicast. Thus, system 300 can receive information from network controller 382 referring to bit rate allocations.

The allocation can include allocating a variable bit rate. The variability of the bit rate can be associated with both the network layer data, e.g., UDP packets resulting in modification to the network jitter, but also by changing the MPEG bit rate (changing program time stamps values), as long as the outcome is a legal video (for example—is a legal MPEG video) and that the program time stamp of the unicast transmission is no bigger than the program time stamp at the beginning of the multicast. The change to the MPEG bit rate can assist in avoiding an introduction of network jitter that may affect the behavior of the user device, e.g., a very big burst may cause buffer overflow at the decoder network buffer resulting in data loss.

Figure 2:
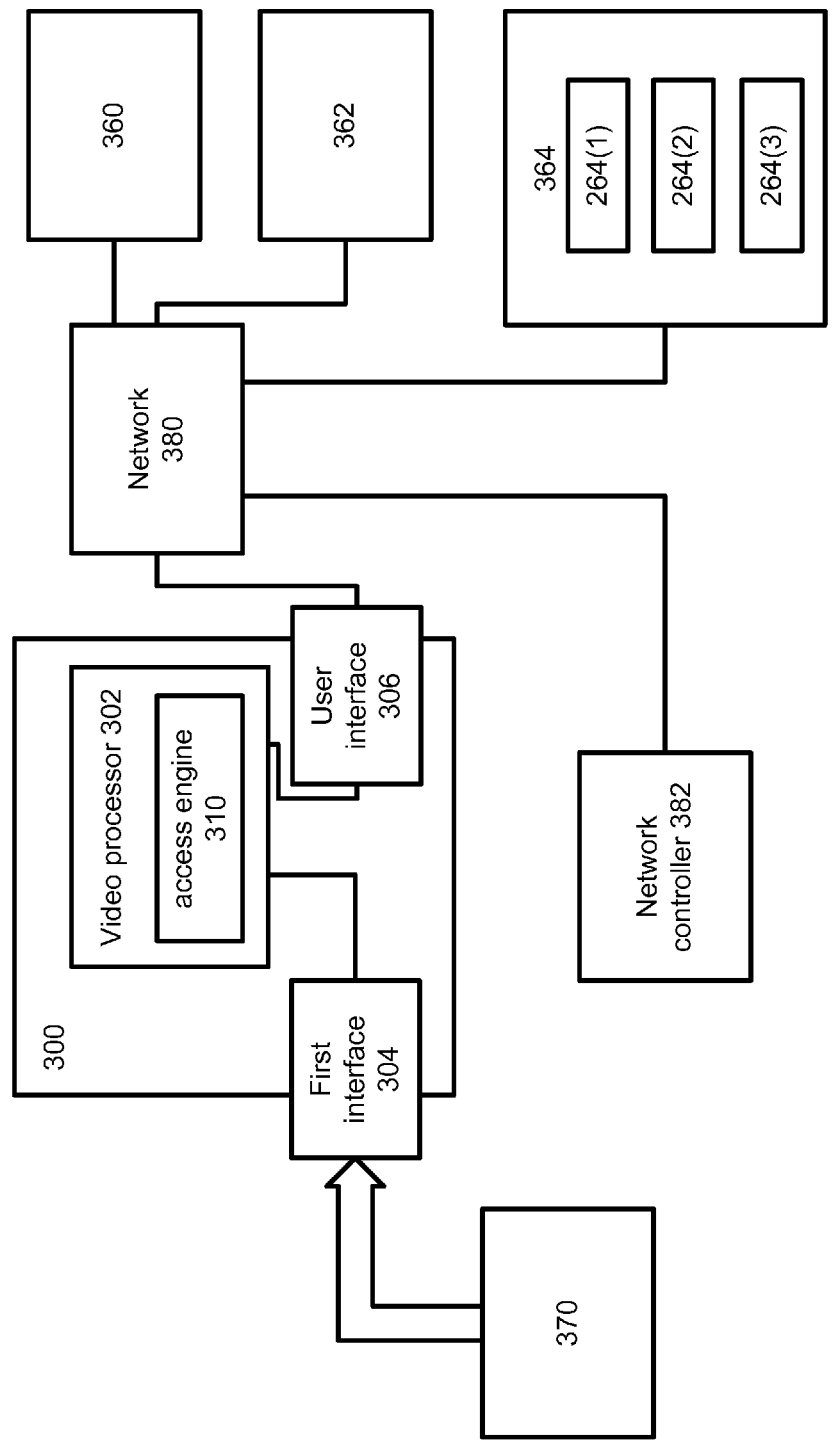
FIG. 2 illustrates a system and its environment according to an embodiment of the invention.

FIG. 2 illustrates system 300 and its environment according to an embodiment of the invention.

System 300 includes video processor 302, first interface 304 for receiving a media stream and user interface 306. The user interface includes a receiver and a transmitter.

Video processor 302 processes video of interest to provide modified video of interest and can also control the transmission (and/or generate) unicast and multicast streams to users.

System 300 receives (via first interface 304) video streams from video source 370. It is also connected (via user interface 306) to network 380 that is connected to users 360, 362 and 364. It is noted that the number of users can exceed three and that network 380 can include wires portions and, additionally or alternatively wireless portions. It can transfer information using various protocols such as but not limited to MPEG-2 transport layer and IP. Users 360, 362 and 364 can be set top boxes, personal computers, home entertainment centers, media players, and the like. They include a buffer and a decoder. The buffer buffers information that is sent (according to DTS) to the decoder ad then is displayed on a display, according to its presentation time stamp.

Conveniently, at least one group of users (existing users) receives a certain channel over multicast stream when a new user requests to switch to that certain channel. This request is also known as a change channel request. Once the request is received and in many cases—until the user can join the multicast stream—the new user receives a media stream that includes video of interest. For example, it can be assumed that user 360 and 362 are existing users that watch a program of Fox News over a multicast stream while user 364 requests to switch from ESPN to Fox news.

A channel change request is sent to system 300 that sends to user 364 a unicast stream that includes modified video of interest. The modification may be executed off-line—before receiving such a request, but it can also be performed in real-time or near real time. The on line or near on-line mode can provide a better adaptation to the actual available bandwidth of a network. Accordingly, the channel request can trigger the modification of the video of interest but this is not necessarily so.

System 300 can receive bit rate limitations from network 380 or from network controller 382. Additionally or alternatively, it can receive information about bit rates that were previously (and/or currently) allocated to various users.

If system 300 is provided with accurate enough information to estimate the duration of the transition of the modified video of interest over network 380 to user 362 then it can modify the timing information (the first PCR) accordingly.

Video processor 302 can be responsive to the maximal bit rate allowed by an element that controls network 380. This information is provided to video processor 302 before it starts modifying the video of interest. The maximal bit rate of this transmission is further limited by the maximal input bit rate allowed by the MPEG buffer model.

Video processor 302 places, before the beginning of the random access point or immediately after that point, metadata such as but not limited to PSI information the MPEG Transport Stream (PAT table, PMT table), and additionally or alternatively, encryption keys in order to decrypt the stream. The first PCR can be placed with this information but is usually co-located with the video random access point data.

Conveniently, the first PCR is stamped, by video processor 302, to have the value of the random access point DTS minus the time needed to transmit the burst given the guaranteed average BR.

According to another embodiment of the invention—if video processor 302 can not estimate (at least with a sufficient accuracy) the duration of the transmission of the burst (for example—if the average bit rate for the burst transmission cannot be guaranteed in advance) then the PCR re-stamping can be implemented by user 362. This modification can be responsive to the actual transmission duration. The latter option can be effective when user 364 utilizes an extra substantial buffer, for example, to mitigate jitter when network 380 is jittered.

The suggested method can be applied in loosely coupled and tightly coupled architectures.

The calculation of the PCR re-stamping can be performed by video processor 302 in various manners. It can be provisioned with the video bandwidth allowed to the user. Video processor 302 can also monitor the bandwidth in the different links on the way to the users. For example, from learning the burst time to a different user located on the same DSLAM that serves the new user, video processor 302 can estimate the delivery time of the next burst.

For example, assuming that new user 364 is connected to a DSLAM via a DSL link that allows 15 Mbps. And, a different user (for example user 360) connected to the same DSLAM just tuned to a channel and got a burst of 8 Mbps. The video processor 302 can assume that the burst size to the new user will be at the scale of 8 Mbps.

Yet for another example, if new user 364 has 15 Mbps on its DSL link, and he already gets HD of 8 Mbps, and a different user connected to the same DSLAM just tuned to a channel and got a burst of 8 Mbps then the maximum burst size to our subscriber will be at the scale of 5 Mbps.

The estimated duration Tde is proportional to the size of the modified video of interest (which is known to video processor 302) and inversely proportional to the available bit rate.

Figure 3:
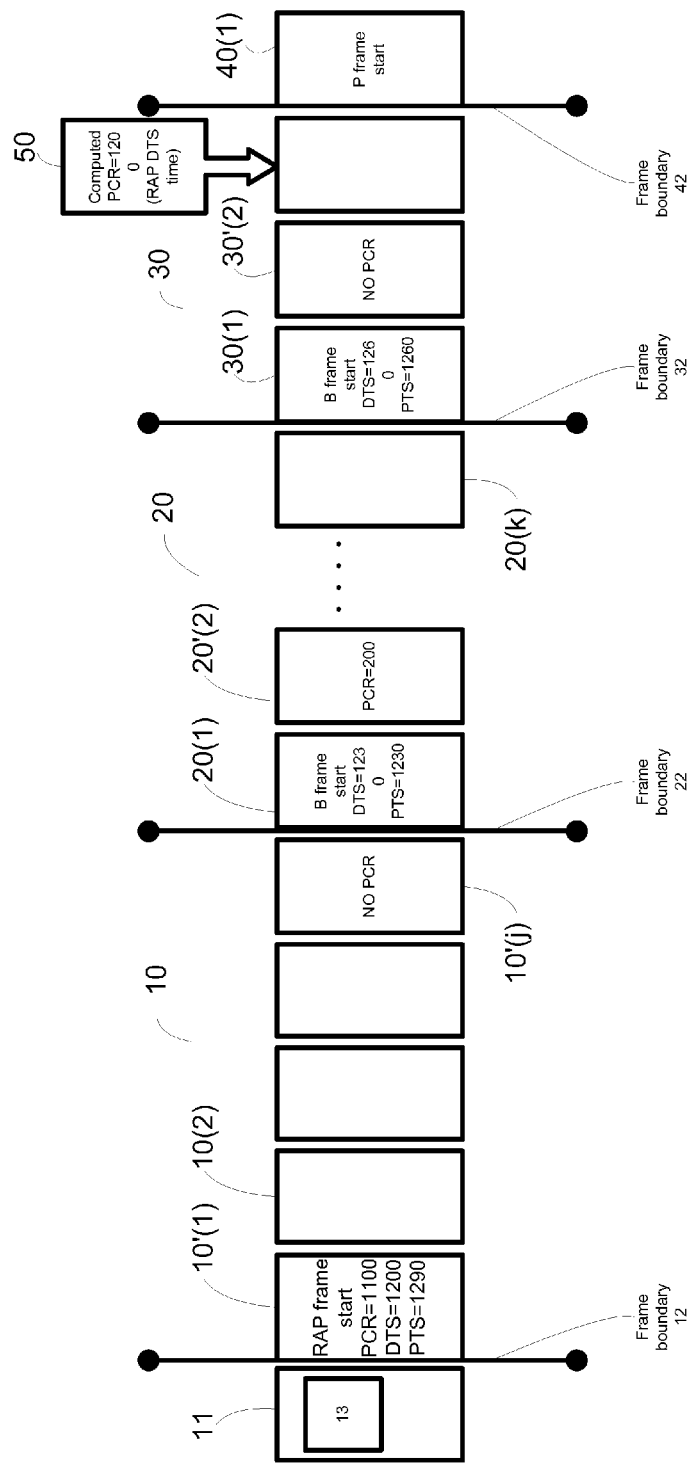
FIG. 3 illustrates a video of interest according to an embodiment of the invention.

Referring to FIG. 3, video processor inserts metadata 13 in packet 11 that is located before boundary 12. Metadata 13 can include a PAT table, a PMT table and a re-stamped PCR. Packet 11 is flagged by "new user" flag 15 indicative that it should be sent to new users (such as user 364) while existing users (such as users 360 and 364) do not receive it. Assuming that the duration (Tde) of transmitting the modified video of interest is about 100 mS the PCR of first packet 10'(1) is updated to 1100 mS (which is DTS−Tde: 1200-100 mS). PCRs of packets 10(j), 20(2) and 30(2) were removed (replaced by stuffing information) to provide modified packets 10'(j), 20'(2) and 30'(2) without PCRs.

If actual duration is longer than the estimated duration then an underflow can occur. This can be solved by providing a slightly longer estimate. There is a tradeoff between the duration of the estimated duration and the required delay—longer durations result in longer delays.

Figure 4:
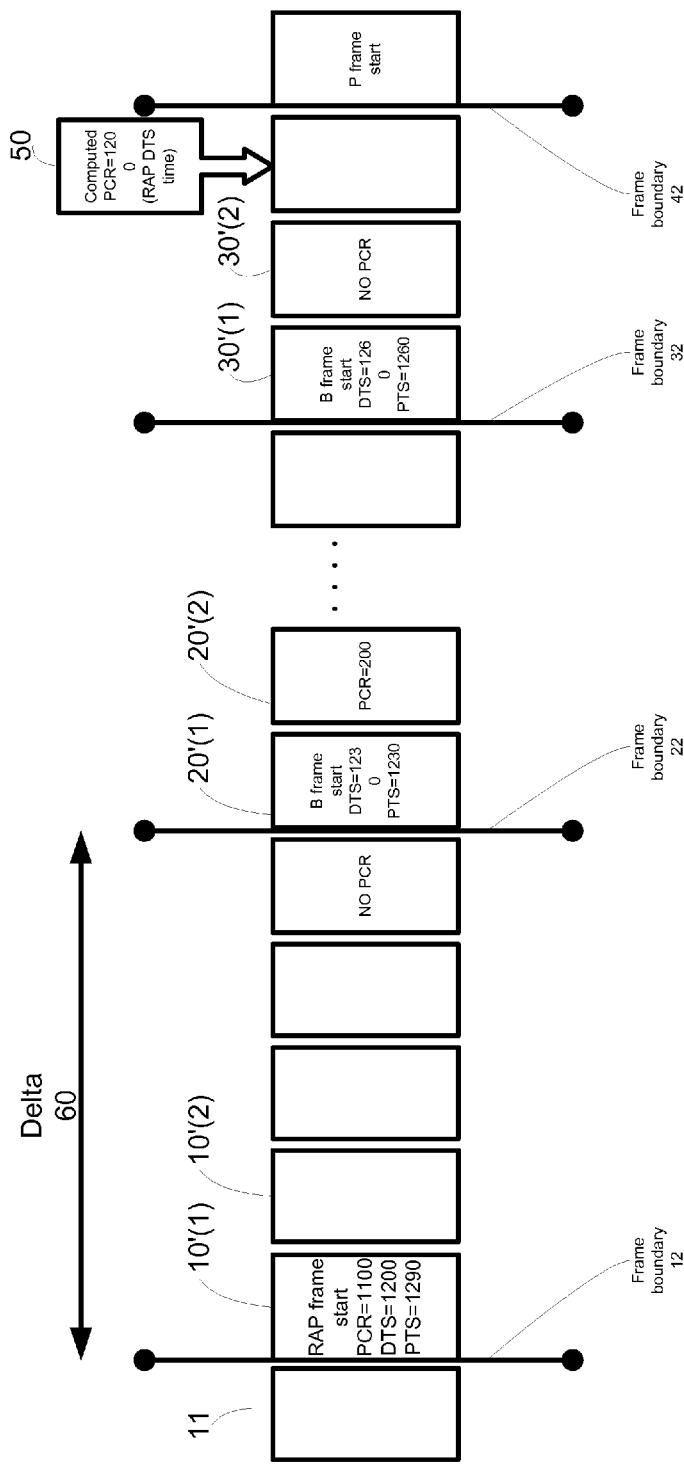
FIG. 4 illustrates a video of interest according to an embodiment of the invention.

Yet for another embodiment of the invention, the video of interest can include the first one or more frames that follow the random access point and not the entire frames till the DTS point in time in this case the duration of transmission of a modified video of interest will be shorter and the first PCR will be re-stamped by (DTS—delta), whereas delta 50 is the duration of transmission of the (shorter) video of interest. Referring to FIG. 4, the modified video of interest includes only first modified frame 10' that follows boundary 12. The PCR will be smaller (as delta 50 is smaller).

It is noted that the more frames and packets included in the video of interest the bigger the amount of video to be transmitted at a burst.

The MPEG transport stream sent from video source 370 to video processor may include conditional access information such as ECM packets. The content of the last ECM packet before boundary 12 is inserted to packet 11.

Conveniently, video processor 302 includes access engine 310. Access engine 310 is responsible for transmitting media streams to users. It can transmit unicast and multicast streams and should be signaled, for example by "new user" flag to which users to send packet 11.

Video processor 302 can locate random access points such as boundary 12 and mark them. This can be done only once per random access point. After video processor 302 modifies the video information of interest then modified video of interest is sent to access engine 310 so that when access engine 310 gets a command to add a new user to the stream it starts emitting the stream right after this command according to the "New users" marking.

Access engine 310 can attempt to accelerate the transmission of the modified video of interest as fast as possible to fill up the buffer of user 364.

A random access point can be a beginning of an open group of pictures. Video processor 302 can modify such a video of interest by closing the GOP—by removing the dependencies (B frames that depend on a previous GOP) from that open GOP.

Existing users continue to receive the open GOP while the new users receive a closed GOP.

According to another embodiment of the invention the user itself can perform the re-stamping. Referring to FIG. 1, user (also referred to as device) 364 has a buffer 264(1), controller 264(2) and decoder 264(3). These components are connected to each other. User 364 usually includes a display on which the decoded video is displayed. Buffer 264(1) receives video of interest. Controller 264(2) does not fetch video from buffer 264(1) till it receives the packet associated with the DTS (packet 30(l)) and then it knows the actual duration (Tda) of the transmission of the video of interest. It then modifies the video of interest by re-stamping the first PCR and removing the other PCRs, in a manner that resembles the video processing of video processor 302. Then it sends the modified video of interest to decoder 264(3).

It is noted that the video processing can be executed by a video processor that is a part of network 380, located within a VSO and the like. Yet according to another embodiment of the invention the user modifies the video of interest by re-stamping the first PCR according to the maximal bit rate acceptable by the video decoder, changing its value to be as close as possible to the RAP DTS.

The user can receive the video or interest or receive an amended video of interest that includes metadata 13 that is positioned near the random access point.

Each of the mentioned above methods or a combination thereof can be executed by one or more computers. Each computer can execute code that is stored in a tangible computer readable medium that can be included in a computer program product.

Figure 5:
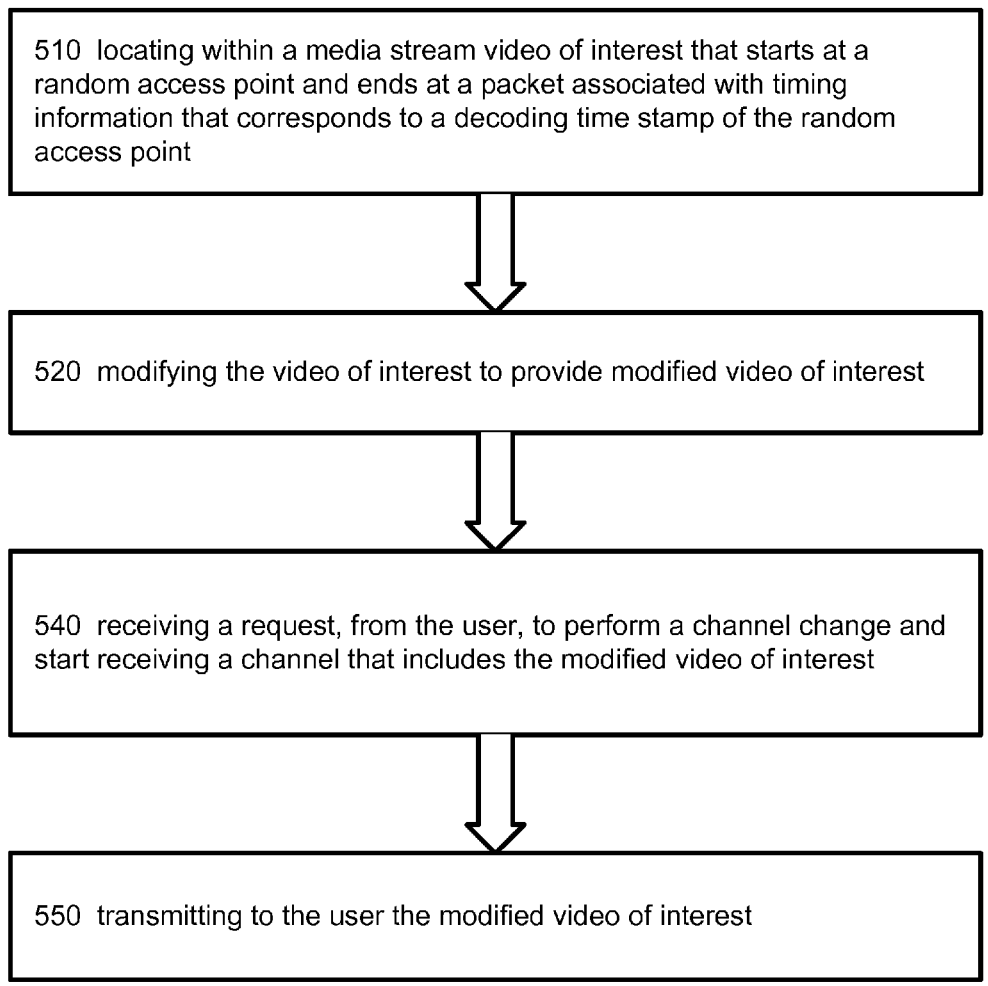
FIG. 5 illustrates a method according to an embodiment of the invention.

FIG. 5 illustrates method 500 according to an embodiment of the invention.

Method 500 starts by stage 510 of locating within a media stream video of interest that starts at a random access point and ends at a packet associated with timing information that corresponds to a decoding time stamp of the random access point. It is noted that stage 510 can include locating multiple videos of interest.

Stage 510 is followed by stage 520 of modifying the video of interest to provide modified video of interest. The includes modifying timing information associated with a beginning of the random access point to reflect a difference between the decoding time stamp and a transmission duration of the modified video of interest to a user. For example, stage 520 can include modifying the first PCR to have a value of DTS-Tde. The modifying can include inserting or otherwise adding a program time stamp (or other timing information) at the beginning of the video of interest.

Stage 520 can also include at least one of the following: (i) placing metadata that comprises conditional access information and program specific information in proximity to the random access point; (ii) removing program time stamps that follow a first program time stamp associated with the random access point; and (iii) removing video that depends upon a group of pictures that precedes the random access point, (iv) Removing non-video data that is to be displayed prior to the RAP PTS, and (v) Adding a PCR at the place corresponding to the RAP DTS.

Stage 520 can be repeated for each video of interest that was found during stage 510. Thus, a media stream can include multiple random access points, each is followed by video of interest. Stage 520 can include modifying each of these videos of interest.

Stage 530 is followed by stage 540 of receiving a request, from the user, to perform a channel change and start receiving a channel that includes the modified video of interest. The request is received while a certain group of pictures is already transmitted (conveniently—being multicast transmitted to existing users). The modified video of interest is associated with that certain group of pictures.

Stage 540 is followed by stage 550 of transmitting to the user the modified video of interest. Stage 550 includes utilizing a bit rate that can be higher than the bit rate used during multicast transmission. Thus, stage 550 can include transmitting to the user the modified video of interest in one or more bursts.

Conveniently, stage 520 includes estimating the transmission duration. This estimation is taken into account when modifying the first PCR. The estimation can take into account maximal allowed bit rate of a buffer model, maximal available bit rate of a network that transfers the modified video of interest, bit rate allocated during pervious burst transmissions, and the like.

Conveniently, stage 550 includes transmitting a unicast stream that comprises the modified video of interest to the user while transmitting a multicast that comprises the video of interest to existing users that were tuned to the channel before the random access point.

Stage 550 of unicast transmitting can end when the user can join a multicast stream that conveys the requested channel.

Figure 6:
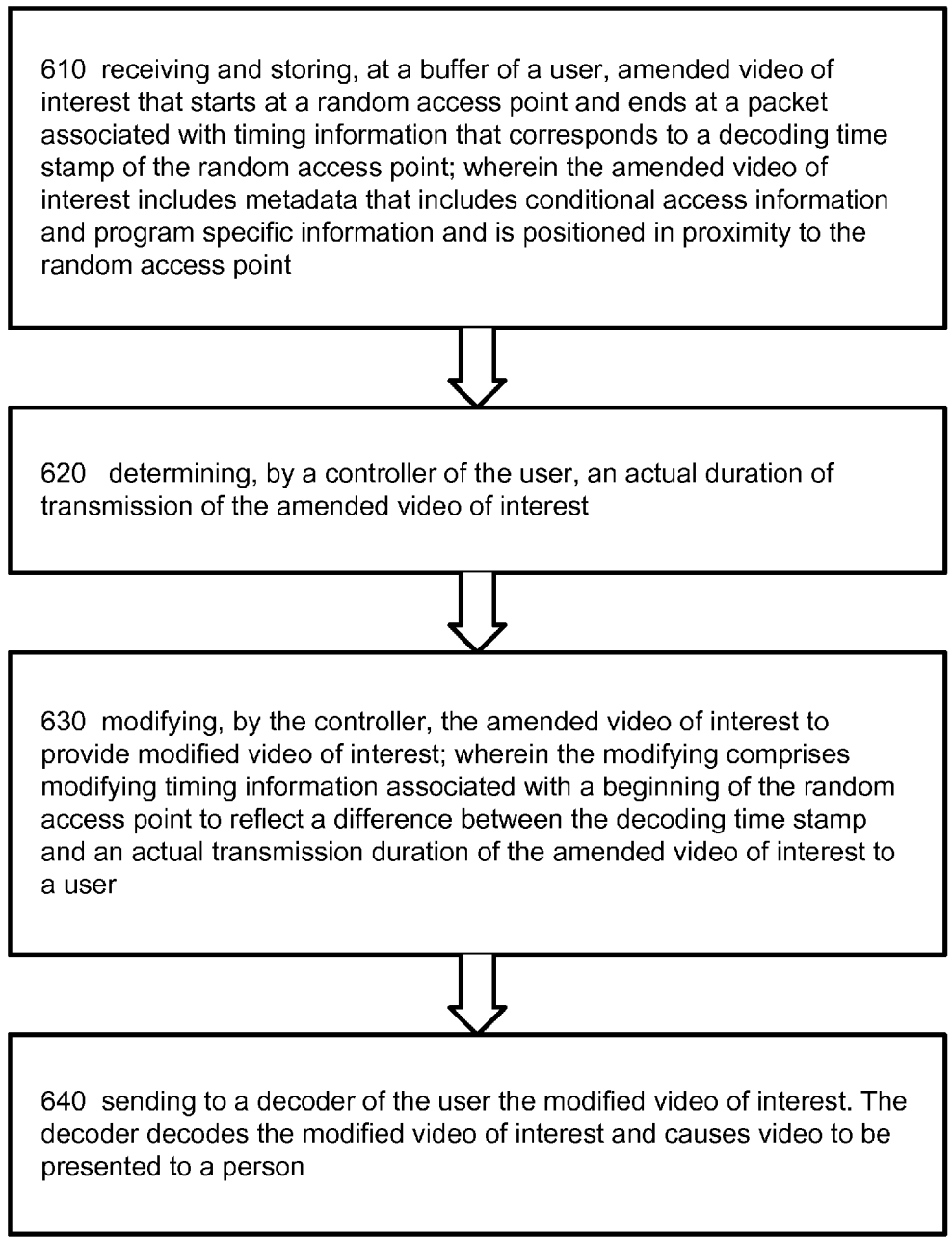
FIG. 6 illustrates a method according to an embodiment of the invention.

FIG. 6 illustrates method 600 according to an embodiment of the invention.

Method 600 starts by stage 610 of receiving and storing, at a buffer of a user, amended video of interest that starts at a random access point and ends at a packet associated with timing information that corresponds to a decoding time stamp of the random access point; wherein the amended video of interest includes metadata that includes conditional access information and program specific information and is positioned in proximity to the random access point.

Stage 610 is followed by stage 620 of determining, by a controller of the user, the minimal duration of transmission of the amended video of interest possible.

Stage 620 is followed by stage 630 of modifying, by the controller, the amended video of interest to provide modified video of interest; wherein the modifying comprises modifying timing information associated with a beginning of the random access point to reflect a difference between the decoding time stamp and the desired transmission duration of the amended video of interest.

Stage 630 is followed by stage 640 of sending to a decoder of the user the modified video of interest. The decoder decodes the modified video of interest and causes video to be presented to a person.

Each of the mentioned above methods can be executed by one or more processors (or computers) that execute instructions stored in a computer readable medium of a computer program product. The computer readable medium can be a disk, a diskette, a DVD, a CD, can be read by using electromagnetic, optical or magnetic techniques. The computer program product can include, in addition to the computer readable medium, instruction, a housing, and the like.

A computer program product is provided. It includes a computer readable medium that stores instructions for: storing, at a buffer of a user, amended video of interest that starts at a random access point and ends at a packet associated with timing information that corresponds to a decoding time stamp of the random access point; wherein the amended video of interest comprises metadata that comprises conditional access information and program specific information and is positioned in proximity to the random access point; determining, by a controller, a desired duration of transmission of the amended video of interest; modifying, by the controller, the amended video of interest to provide modified video of interest; wherein the modifying comprises modifying timing information associated with a beginning of the random access point to reflect a difference between the decoding time stamp and the desired transmission duration of the amended video of interest to a user; sending to a decoder of the user the modified video of interest.

A computer program product is provided. It includes a computer readable medium that stores instructions for: locating within a media stream video of interest that starts at a random access point and ends at a packet associated with timing information that corresponds to a decoding time stamp of the random access point; modifying the video of interest to provide modified video of interest; wherein the modifying comprises modifying timing information associated with a beginning of the random access point to reflect a difference between the decoding time stamp and a transmission duration of the modified video of interest to a user; receiving a request, from the user, to perform a channel change and start receiving a channel that comprises the modified video of interest; and transmitting to the user the modified video of interest.

According to an embodiment of the invention wherein the modifying of timing information comprises modifying the timing information to reflect the difference between the decoding time stamp of the random access point and a minimal time period that takes into account the timing limitations of the decoder (for example—size of the modified video of interest divided by the maximal allowable bit rate). The minimal time period can be as small as possible while not violating the limitations on the decoder input, such as MPEG-2 limitations. This would allow the decoder to lock on the program clock as soon as possible and also to present the first frame no later than as implied by the transmission duration relative to the program time stamp associated with the random access point.

Conveniently, when the method can include modifying timing information associated with a beginning of the random access point to reflect the minimal time between the beginning of the random access point and its decoding time stamp while not violating the limitations on the decoder input, such as MPEG-2 limitations.

Conveniently, the amended video of interest can include a closed GOP, as well as metadata that comprises conditional access information and program specific information and is positioned in proximity to the random access point, and does not include any non-video data that is to be presented prior to the random access point decoding time stamp"

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method, the method comprises:
locating within a media stream video of interest, wherein the video of interest starts at a random access point and ends at a packet associated with timing information that corresponds to a decoding time stamp of the random access point;
modifying the video of interest to provide modified video of interest; wherein the modifying comprises modifying a programming time stamp associated with a beginning of the random access point to reflect a difference between the decoding time stamp and a transmission duration of the modified video of interest to a user;
receiving a request, from the user, to perform a channel change and start receiving a channel that comprises the modified video of interest; and
transmitting to the user the modified video of interest.

2. The method according to claim 1 comprising allocating bitrates to unicast streams in response to available bit rate for unicast streams and number of unicast streams being transmitted over a network coupled to the system.

3. The method according to claim 2 comprising allocating variable bitrates to the unicast streams.

4. The method according to claim 1 comprising setting the programming time stamp to a value that substantially equals the decoding time stamp minus the transmission duration.

5. The method according to claim 1 comprising placing metadata that comprises conditional access information and program specific information in proximity to the random access point.

6. The method according to claim 1 comprising removing program time stamps that follow the program time stamp associated with the random access point that have value smaller than the decoding time stamp of the random access point.

7. The method according to claim 1 comprising estimating the transmission duration.

8. The method according to claim 1 comprising removing video that depends upon a group of pictures that precedes the random access point.

9. The method according to claim 1 comprising removing non-video information that is to be displayed prior to the decoding time stamp of the random access point.

10. The method according to claim 1 comprising adding a program time stamp at a location corresponding to the decoding time stamp of the random access point.

11. The method according to claim 1 wherein the modifying comprises adding a program time stamp at the start of the video of interest.

12. The method according to claim 1 comprising transmitting a unicast stream that comprises the modified video of interest to the user while transmitting a multicast that comprises the video of interest to existing users that were tuned to the channel before the random access point.

13. A system comprising:
a first interface for receiving a media stream;
a video processor configured to:
locate within a media stream video of interest, wherein the video of interest starts at a random access point and ends at a packet associated with timing information that corresponds to a decoding time stamp of the random access point;
modify the video of interest to provide modified video of interest by modifying a program time stamp associated with a beginning of the random access point to reflect a difference between the decoding time stamp and a transmission duration of the modified video of interest to a user; and
a user interface configured to:
receive a request, from the user, to perform a channel change and start receiving a channel that comprises the modified video of interest; and
transmit to the user the modified video of interest.

14. The system according to claim 13 wherein the video processor is arranged to set the programming time stamp to a value that substantially equals the decoding time stamp minus the transmission duration.

15. The system according to claim 13 wherein the video processor is configured to place metadata that comprises conditional access information and program specific information in proximity to the random access point.

16. The system according to claim 13 wherein the video processor is configured to remove program time stamps that follow the program time stamp associated with the random access point that have value smaller than the decoding time stamp of the random access point.

17. The system according to claim 13 wherein the video processor is configured to estimate the transmission duration.

18. The system according to claim 13 wherein the user interface is configured to transmit a unicast stream that comprises the modified video of interest to the user while transmitting a multicast that comprises the video of interest to existing users that were tuned to the channel before the random access point.

19. The system according to claim 13 further configured to remove non-video information that is to be displayed prior to the decoding time stamp of the random access point.

20. The system according to claim 13 further configured to add a program time stamp at a location corresponding to the decoding time stamp of the random access point.

21. The system according to claim 13 wherein the video processor is further configured to add a program time stamp at the start of the video of interest.

22. A method, the method comprises:
storing, at a buffer of a user, amended video of interest that starts at a random access point and ends at a packet associated with timing information that corresponds to a decoding time stamp of the random access point; wherein the amended video of interest comprises metadata that comprises conditional access information and program specific information and is positioned in proximity to the random access point;
determining, by a controller, an actual duration of transmission of the amended video of interest;
modifying, by the controller, the amended video of interest to provide modified video of interest; wherein the modifying comprises modifying a program time stamp associated with a beginning of the random access point to reflect a difference between the decoding time stamp and an actual transmission duration of the amended video of interest to a user;
sending to a decoder of the user the modified video of interest.

23. A device, comprising:
a buffer of a user, configured to store amended video of interest that starts at a random access point and ends at a packet associated with timing information that corresponds to a decoding time stamp of the random access point; wherein the amended video of interest comprises metadata that comprises conditional access information and program specific information and is positioned in proximity to the random access point;
a controller configured to:
determine an actual duration of transmission of the amended video of interest;
modify, by the controller, the amended video of interest to provide modified video of interest; wherein the modifying comprises modifying a program time stamp associated with a beginning of the random access point to reflect a difference between the decoding time stamp and an actual transmission duration of the amended video of interest to a user; and
send to a decoder of the user the modified video of interest.

* * * * *